(12) United States Patent
Soni et al.

(10) Patent No.: US 9,411,786 B2
(45) Date of Patent: Aug. 9, 2016

(54) METHOD AND APPARATUS FOR DETERMINING THE RELEVANCY OF HYPERLINKS

(71) Applicant: Adobe Systems Incorporated, San Jose, CA (US)

(72) Inventors: Sachin Soni, New Delhi (IN); Anmol Dhawan, Ghaziabad (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 232 days.

(21) Appl. No.: 13/936,803

(22) Filed: Jul. 8, 2013

(65) Prior Publication Data

US 2015/0012806 A1    Jan. 8, 2015

(51) Int. Cl.
    G06F 17/00    (2006.01)
    G06F 17/22    (2006.01)
    G06F 17/30    (2006.01)

(52) U.S. Cl.
    CPC ...... *G06F 17/2235* (2013.01); *G06F 17/30867* (2013.01)

(58) Field of Classification Search
    CPC .......... G06F 17/2235; G06F 17/30864; G06F 17/30861; G06F 17/3089
    See application file for complete search history.

(56) References Cited

U.S. PATENT DOCUMENTS

| | | | | |
|---|---|---|---|---|
| 5,669,007 A * | 9/1997 | Tateishi | ............... | G06K 9/2054 715/210 |
| 5,878,421 A * | 3/1999 | Ferrel et al. | | |
| 6,216,121 B1 * | 4/2001 | Klassen | | |
| 6,256,648 B1 * | 7/2001 | Hill et al. | ...................... | 715/234 |
| 6,457,025 B2 * | 9/2002 | Judson | ........................ | 715/201 |
| 6,665,837 B1 * | 12/2003 | Dean et al. | ..................... | 715/234 |
| 6,718,363 B1 * | 4/2004 | Ponte | ............................. | 709/203 |
| 6,732,332 B1 * | 5/2004 | Borysewicz et al. | ......... | 715/240 |
| 6,754,873 B1 * | 6/2004 | Law | .................. | G06F 17/30864 707/999.003 |
| 6,799,300 B1 * | 9/2004 | Hishida | ............... | G06F 17/2241 707/E17.119 |
| 7,356,530 B2 * | 4/2008 | Kim et al. | ...................... | 707/709 |
| 7,493,253 B1 * | 2/2009 | Ceusters et al. | ................... | 704/9 |
| 7,558,584 B2 * | 7/2009 | Yamamoto | .............. | H04W 4/02 455/456.1 |
| 7,810,035 B2 * | 10/2010 | Dominowska et al. | ....... | 715/739 |
| 8,190,625 B1 * | 5/2012 | Beach | ............... | G06F 17/30014 707/718 |
| 8,433,712 B2 * | 4/2013 | Koide | ..................... | G06F 21/41 707/748 |
| 8,751,601 B2 * | 6/2014 | Edge | ................. | H04L 29/12066 709/217 |
| 2003/0018650 A1 * | 1/2003 | Priestley | ............. | G06F 17/3089 |
| 2003/0061214 A1 * | 3/2003 | Alpha | ............... | G06F 17/30864 |
| 2004/0205516 A1 * | 10/2004 | Tufts | ........................ | H04L 29/06 715/205 |
| 2005/0172225 A1 * | 8/2005 | Kobashi | ................. | G06F 17/212 715/244 |
| 2005/0251393 A1 * | 11/2005 | Georgescu | ........ | G06F 17/30899 704/270.1 |
| 2006/0074984 A1 * | 4/2006 | Milener | ............ | G06F 17/30876 |
| 2006/0101341 A1 * | 5/2006 | Kelly | ................. | G06F 17/30899 715/738 |
| 2006/0195442 A1 * | 8/2006 | Cone | ................. | G06F 17/30867 |
| 2006/0294454 A1 * | 12/2006 | Matsuda | ............. | G06F 3/04892 715/205 |

(Continued)

*Primary Examiner* — Laurie Ries
(74) *Attorney, Agent, or Firm* — Keller Jolley Preece

(57) ABSTRACT

A computer implemented method and apparatus for determining the relevancy of hyperlinks. The method comprising determining at least one relevant link on a current page presented to a user, wherein the relevancy of the link is based on content retrieved from one or more pages selected by the user for presentation previous to the current page; and indicating the at least one relevant link.

20 Claims, 3 Drawing Sheets

(56) References Cited

U.S. PATENT DOCUMENTS

| | | | |
|---|---|---|---|
| 2007/0253330 A1* | 11/2007 | Tochio | H04L 12/423 370/222 |
| 2008/0005130 A1* | 1/2008 | Logan | G06F 17/30053 |
| 2008/0133460 A1* | 6/2008 | Clark et al. | 707/2 |
| 2008/0263022 A1* | 10/2008 | Kostorizos et al. | 707/5 |
| 2010/0138452 A1* | 6/2010 | Henkin | G06Q 30/0256 707/803 |
| 2010/0228718 A1* | 9/2010 | Chen | 707/709 |
| 2011/0307819 A1* | 12/2011 | Vadlamani | G06F 17/30864 715/771 |
| 2012/0099838 A1* | 4/2012 | Lehman | G11B 27/034 386/241 |
| 2012/0323908 A1* | 12/2012 | Herbert et al. | 707/728 |
| 2013/0031088 A1* | 1/2013 | Srikrishna et al. | 707/722 |
| 2013/0173568 A1* | 7/2013 | Josifovski et al. | 707/706 |
| 2013/0325834 A1* | 12/2013 | Simburg | 707/706 |
| 2014/0188831 A1* | 7/2014 | Benchenaa et al. | 707/706 |

* cited by examiner

3 References     _— 302     300

This document uses the following terms: CMYK, color space, gamut, ICC profiles, L*a*b*, LUT, PCS, rendering intent, RGB, and XYZ. Readers are expected to be familiar with these terms and concepts, as well as with the various tags and other elements of ICC profiles. Introductory material about terminology, color conversion, and color profiles is available in the following documents: _— 304

- Tutorials on ICC color management and specifications for ICC profiles: http://www.color.org

- White paper "Color Consistency and Adobe Creative Suite": http://www.adobe.com/products/creativesuite/pdfs/cscolormgmt.pdf

International Cricket Council _— 308
www.icc-cricket.com/
The Ireland coach Phil Simmons has kept faith with the players who won both its ICC Cricket World Cup qualifying games against the United Arab Emirates ...

International Criminal Court - Wikipedia, the free encyclopedia _— 310
en.wikipedia.org/wiki/International_Criminal_Court
The International Criminal Court (commonly referred to as the ICC or ICCt) is a permanent tribunal to prosecute individuals for genocide, crimes against ...

Internet Chess Club _— 312
www.chessclub.com/
Play chess online. Improve your chess, learn chess openings and tactics, view instructional chess videos. ICC, the best chess site on the net!

INTERNATIONAL COLOR CONSORTIUM _— 314
www.color.org/index.xalter
The International Color Consortium....promoting and encouraging the standardization of an open color management system.

FIG. 3B

METHOD AND APPARATUS FOR DETERMINING THE RELEVANCY OF HYPERLINKS

BACKGROUND OF THE INVENTION

1. Field of the Invention

Embodiments of the present invention generally relate to web navigation and, more particularly, to a method and apparatus for determining the relevancy of hyperlinks.

2. Description of the Related Art

Often when navigating through web pages or viewing other types of documents, a user is presented with hyperlinks. Hyperlinks are references to data that the user can follow. A hyperlink may point to a new document (i.e., an external document) or to a specific element within (internal to) a document. For example, in some cases, when the user sees a word or phrase in a page currently being viewed for which they would like more information, the word or phrase may be copied and pasted from the current page into a search engine as a search request, using a browser. In response to the search request, the user is presented with a plurality of possibly relevant hyperlinks that are external to the document being viewed. The user can then select one of the hyperlinks in order to obtain more information about that selected word or phrase, and even continue this process and follow one or more of the found hyperlinks to additional documents with additional hyperlinks.

An additional way a user can arrive at external links, would be if the user right clicked on a word presented in a document and a drop down menu appeared in which the user could select "look up" or a similar search request function, which is a search technique similar to the above noted browser initiated search request. In other cases, for example, when the user is viewing a Portable Document Format (PDF) document, selection of a link embedded in the document being viewed may open an external web page or open a file, while selection of an internal link may open a different page within a current document, and the like. Often, in response to such page to page navigation, a user is provided along the way with a significant number of hyperlinks. Some of those hyperlinks may lead to presentation of information relevant to the user and some of those hyperlinks may not lead to presentation of relevant information.

When the user selects a presented hyperlink in expectation of it leading to relevant information, the next page presented to the user may indeed provide the user with further relevant information, or may not, and may possibly provide one or more additional hyperlinks. Thus, the new page may bring the user closer to the information he or she is seeking, or the new page may have no information relevant to the user's needs, in which case, the user may then return to a previous page or continue navigating via further hyperlinks in an effort to continue to seek relevant information. This "hit or miss" search for relevant information results in wasted time and a poor user experience.

Therefore, there is a need for a method and apparatus for determining the relevancy of hyperlinks.

SUMMARY OF THE INVENTION

A method and apparatus for determining the relevancy of hyperlinks substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A and 3B illustrate an example of how the method of FIG. 2 is used to determine relevant links, according to one or more embodiments.

Figure 1:
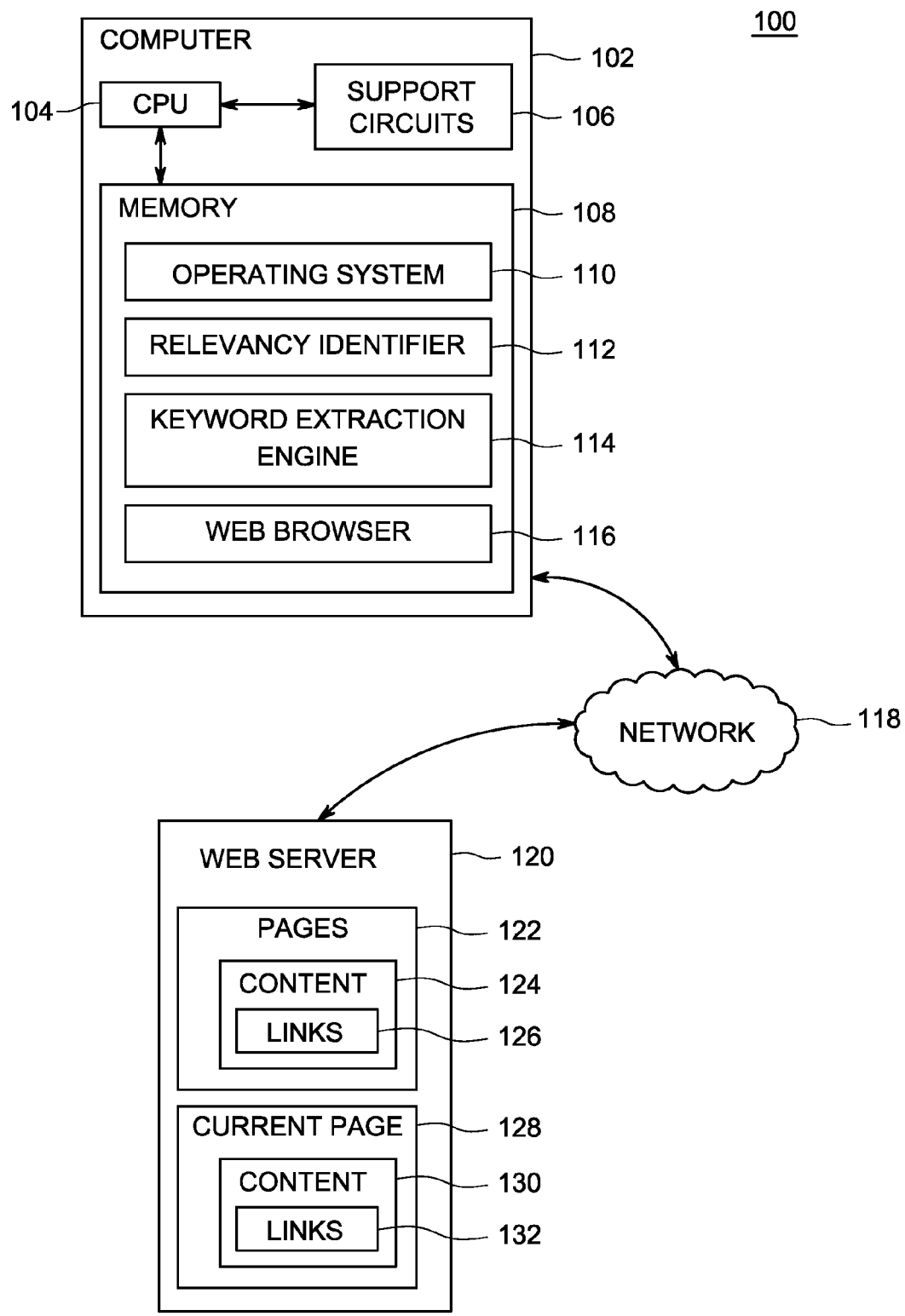
FIG. 1 is a block diagram of an apparatus for determining the relevancy of hyperlinks, according to one or more embodiments.

While the method and apparatus is described herein by way of example for several embodiments and illustrative drawings, those skilled in the art will recognize that the method and apparatus for determining the relevancy of hyperlinks is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for determining the relevancy of hyperlinks defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for determining the relevancy of hyperlinks (hereafter referred to as links). The embodiments determine, based on the path that was taken to navigate to a current page, what links at the current page contain content that is most relevant to the user and provides an indication, such as color coding, to distinguish the most relevant links. For example, a user may begin at pageA, then proceed to pageB, pageC, and arrive at a current page, pageD.

The embodiments determine the link sequence that led a user to the current page. In this example, the link sequence is pageA→pageB→pageC→pageD. In order to determine the most relevant links on the current pageD, content is retrieved from each of the previously visited pages that is in the vicinity of each of the selected links (i.e., the links used to sequentially navigate from one page to the next). A priority is assigned to the retrieved content: the farther a page having retrieved content is from the current page, the lower the priority of the content retrieved from that page. Thus, in the current example, pageA has a lower priority than pageB, which has a lower priority than pageC, which has a lower priority than pageD. Keywords are extracted from the retrieved content using a keyword extraction engine and the keywords are associated with the assigned priority of the page from which they were extracted.

For each link on the current page, content is retrieved from the destination of the link (i.e., from the page at which one arrives upon clicking on the link). In order to determine which links include content that is most relevant to the user, a keyword extraction engine extracts keywords from the content of the destination links. The keywords indicate the topic of the content at the destination of the link. The keywords from the destination links are matched to the keywords from the content of the previous pages. The destination links that include the most matches with the keywords from content on previous pages are considered relevant and are prioritized based on the relevance of the keywords given the link sequence.

Advantageously, the present invention may be used in software applications that present pages of content to a user for viewing, such as ADOBE® ACROBAT® or ADOBE® BUZZWORD® or as a plug-in to a browser, to assist users by determining relevant links.

Various embodiments of a method and apparatus for determining the relevancy of hyperlinks are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for determining the relevancy of hyperlinks, according to one or more embodiments. The system 100 includes a computer 102, and a web server 120, communicatively coupled via a network 118. The computer 102 is a type of computing device (e.g., a laptop, a desktop, a Personal Digital Assistant (PDA), a tablet, a mobile phone and/or the like) known to one of ordinary skill in the art. The computer 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, a relevancy identifier 112, a keyword extraction engine 114, and a web browser 116. The relevancy identifier 112 and keyword extraction engine 114 are configured to provide additional functionalities to the browser (e.g., an add-on, plug-in, or extension) that facilitates content extraction and comparison. Furthermore, the term "browser" is intended to include any software, application, web tool, applet, widget and/or the like that can be used to render content for display. The operating system 110 may include various commercially known operating systems. The keyword extraction engine 114 is any third-party keyword extraction and matching engine available that is capable of extracting keywords from a given Universal Resource Locator (URL) or content. According to some embodiments, the web browser 116 is utilized to view content 124 on pages 122. Examples of web browser 116 may include, but are not limited to, FIREFOX®, GOOGLE® CHROME™, INTERNET EXPLORER®, OPERA™, and SAFARI®, ANDROID® browser, FIREFOX® for mobile, INTERNET EXPLORER® Mobile, among others.

The web server 120 includes a plurality of pages 122 and a current page 128. Each page 122 includes content 124. The content 124 may include a one or more links 126. Similarly, the current page 128 includes content 130, which includes one or more links 132. The network 118 includes a communication system that connects computers (or devices) by wire, cable, fiber optic and/or wireless link facilitated by various types of well-known network elements, such as hubs, switches, routers, and the like. The network 118 may employ various well-known protocols to communicate information amongst the network resources. For example, the network 118 may be a part of the Internet or Intranet using various communications infrastructures, such as Ethernet, Wi-Fi, Wi-Max, General Packet Radio Service (GPRS), and the like.

A user views content 130 from a current page 128 that is transferred from the web server 120 and viewed via the web browser 116. The user selects content 130 on the current page 128 in hopes of finding relevant information. The selected content 130 may be a word or phrase that is input as a search request to a search engine. In response to the search request, the user is presented with a plurality of possibly relevant links. Alternatively, the selected content 130 itself may be a link 132. As such, the selected content 130 is hereafter referred to as a link 132. In either event, the relevancy identifier 112 determines the link sequence that led the user to the current page 128. The link sequence is the sequence of pages 122 that were visited before the user arrived at the current page 128, starting from, for example, a first page 122a (not shown), a second page 122b (not shown), (collectively referred to as pages 122) that were visited to the current page 128. The link sequence is the sequence of pages 122 that are visited during a browser session with no discontinuity (i.e., no closing of browser between pages). The pages 122 that were visited may be tracked using the browser history or any web page tracking mechanism known in the art.

The relevancy identifier 112 retrieves content 124 from the vicinity of the links 126 from the pages 122 that led the user to the current page 128. In one embodiment, the user did not visit any page before the current page 128, meaning the current page 128 is the entire link sequence. In another embodiment, the user has visited one or more pages 122 before arriving at the current page 128. In the case of the first page, the content 124a (not shown) in the vicinity of the link 126a (not shown) may be, for example, the four lines in the first page 122 that precedes the clicked link 126a and the four lines of the first page 122a after the clicked link 126a. The relevancy identifier 112 then assigns a priority to the content 124a. The priority is based on where in the link sequence the first page 122a is located. The farther the page 122 is from the current page 128, the lower the priority of the content 124 that was retrieved from that page 122. The keyword extraction engine 114 extracts keywords from the retrieved content 124 and prioritizes the keywords based on the priority of the page 122 from which they were extracted.

The relevancy identifier 112 then retrieves content from the destination of each link 132 on the current page 122 and sends the content to the keyword extraction engine 114 to extract keywords from the retrieved content. The relevancy identifier 112 compares the prioritized keywords from the previously visited pages 122 to the keywords extracted from the content retrieved from the destination of the links 132 and determines any matches. The links 132 that have keywords that match the higher priority keywords from the previous pages 122 are determined to be the most relevant. The relevancy identifier 112 then displays the links 132 on the current page 122 in a way that indicates which links are most relevant. In some embodiments, the relevant links may be color-coded, with the most relevant link or links indicated in one color such as red, and less relevant links indicated in lighter shades of red or a different color entirely. In some embodiments, the relevant links may be indicated by bold highlighting and less relevant links indicated with less bold highlighting. However, any method may be used to indicate which of the one or more links is most relevant. In some embodiments, the most relevant link is indicated. In some embodiments, a predefined number of links is indicated. In some embodiments, the number of links that are indicated as most relevant is proportional to the number of links that are on the page. For example, if there are five links on the page, only the most relevant link may be indicated. However, if there are twenty links on the page, the top four most relevant links may be indicated.

Figure 2:
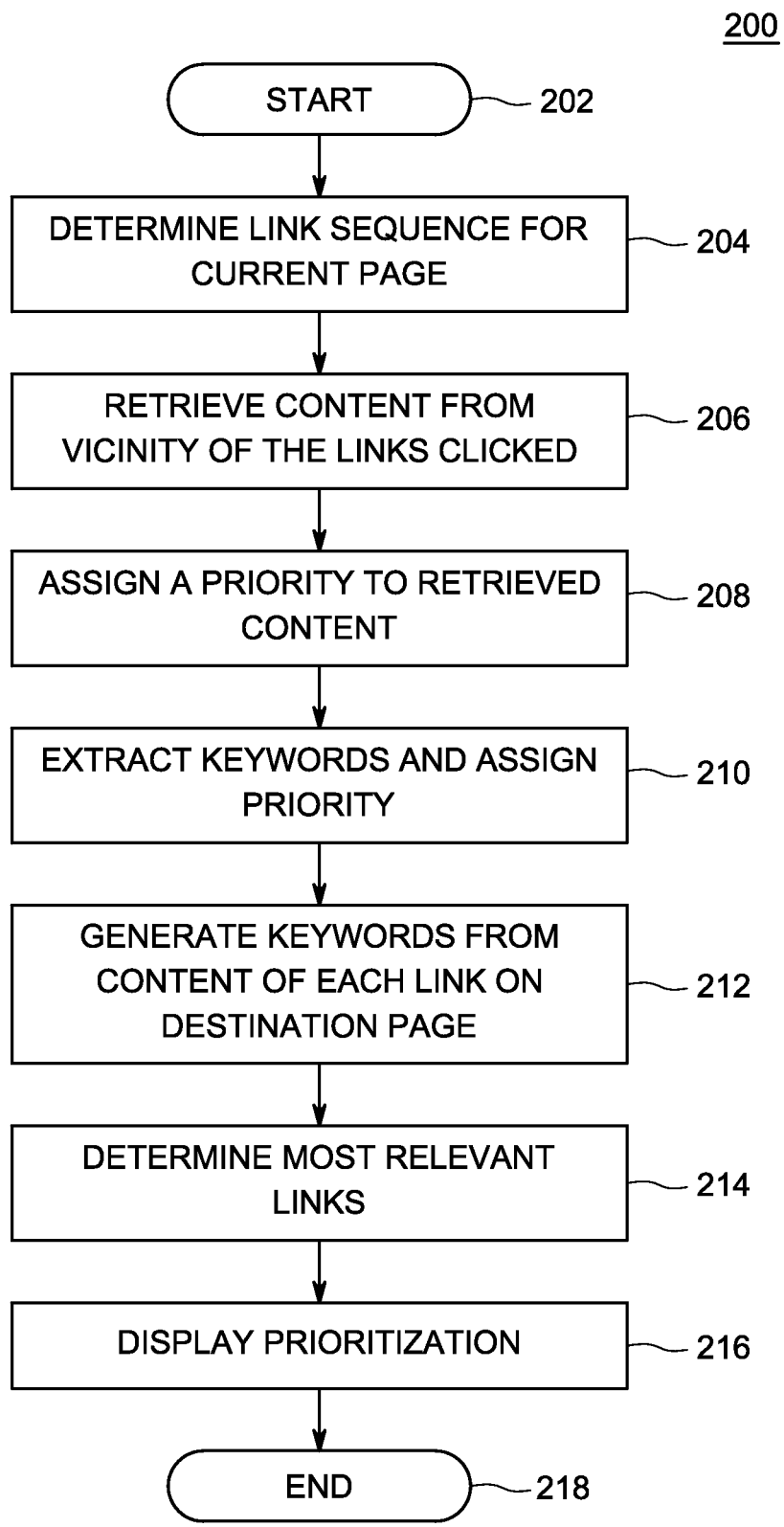
FIG. 2 is a flowchart of a method for determining the relevancy of hyperlinks as performed by the relevancy identifier of FIG. 1, according to one or more embodiments.

FIG. 2 is a flowchart of a method 200 for determining the relevancy of hyperlinks as performed by the relevancy identifier 112 of FIG. 1, according to one or more embodiments. The method 200 is performed each time a user clicks on a link. The method 200 extracts keywords from content retrieved from previously visited pages and compares those keywords to keywords extracted from the content retrieved from the links on the current page to determine the relevancy of the links.

The method 200 starts at step 202 and proceeds to step 204. At step 204, the method 200 determines a link sequence for the current page. When a user clicks on a link, whether the user is in a document or on a web page, the method 200 determines the sequence of links that were clicked that led the user to the current page. For example, a user may begin at pageA, then proceed to pageB, pageC, and arrive at a current page, pageD. The link sequence in this example is pageA→pageB→pageC→pageD. The pages may be pages of a document, file names, URLs, and the like.

The method 200 proceeds to step 206, where the method 200 retrieves content in the vicinity of the links clicked on the page. The content in the vicinity is likely to contain information relevant to the link. The method 200 retrieves a predetermined number of lines of content from the previous page based on proximity to the link. For example, the method 200 may retrieve four lines of content on the page located before the clicked link and four lines of content on the page located after the clicked link. In some embodiments, where a link is used as a reference to other content on the page, the method 200 may retrieve content proximate with referenced content rather than proximate to the actual link.

The method 200 proceeds to step 208, where the method 200 assigns a priority to the retrieved content. The priority is based on from where in the link sequence the page from which the content was retrieved is located. The farther the page is from the current page, the lower the priority of the content that was retrieved from that page. For example, the user began at pageA, then proceeded to pageB, pageC, and arrived at the current page, pageD. The link sequence in this example is pageA→pageB→pageC→pageD; therefore, pageA has a lower priority than pageB, which has a lower priority than pageC, which has a lower priority than pageD.

The method 200 proceeds to step 210, where the method 200 extracts keywords from the content and assigns the keywords a priority based on the page from which they were retrieved. The method 200 uses a keyword extraction engine. The keyword extraction engine may be any keyword extraction engine capable of extracting keywords, such as ADOBE Sedona, that may extract single word phrases, two word phrases, or n-word phrases from the content. These phrases are herein referred to as keywords. Each keyword is assigned the priority of the page from which its content was retrieved.

The method 200 proceeds to step 212, where the method 200 accesses each link on the current page and extracts keywords from the content at each of the link destinations using the keyword extraction engine.

The method 200 proceeds to step 214, where the method 200 determines the most relevant links on the current page. The method 200 matches keywords retrieved from the links on the current page with the prioritized keywords from the previously visited pages. The link that includes the most matches of keywords is determined to have the highest relevancy to the user. The link that includes the second most number of matches of keywords is determined to have the second highest relevancy to the user, and so on. In some embodiments, other methods of context matching may be used. For example, instead of extracting keywords, paragraphs or lines may be extracted and compared with paragraphs or lines of other content.

The method 200 proceeds to step 216, where the method 200 displays the links in the current page with indicators of relevance. In some embodiments, the method 200 color codes the determined most relevant link with a first color and a pre-determined number of other links that are relevant with a second color. For example, if there are twenty links on the page, the method 200 may determine that four of the links are relevant. The most relevant link may be color coded, for example, red, and the other three relevant links may be color coded, for example, blue. In other embodiments, the four relevant links may be color coded with the same color and the most relevant link may be indicated by bold highlighting, and less relevant links with less bold highlighting. In other embodiments, the ranking of the relevancy can be indicated by the font size, where a larger font indicates a greater relevancy. However, any manner of indicating which links are determined to be relevant or more relevant may be used.

The method 200 proceeds to step 218 and ends.

FIGS. 3A and 3B illustrate an example of how the method 200 of FIG. 2 is used to determine relevant links, according to one or more embodiments of the invention. FIG. 3A is a screen shot 300 of the area of a current page 302 from which a user is reading. The user is starting at the current page 302; therefore, the link sequence contains only the current page 302. The user is reading a document on ADOBE® Black Point Compensation. While reading the document, the user may want more information on the term ICC 304. From within the document, the user may right click on the term ICC 304, and select an option, for example, "Search Google for ICC", which leads the user to a GOOGLE® search of the term ICC. Alternatively, a user may copy the content ICC 304 and paste it into a search engine or open a new tab and type the query manually. The selected content, i.e., the term ICC 304 is referred to as a link.

As describe in FIG. 2 above, keywords are extracted from the vicinity of the content where the link is clicked. In this example, the content in the vicinity of the selected content 304 may be the four lines before the selected content 304, specifically, "with these terms and concepts, as well as with the various tags and other elements of ICC profiles. Introductory material about terminology, color conversion, and color profiles is available in the following documents: Tutorials on ICC color management and specifications for ICC profiles:" and the four lines after the selected content, specifically, "White paper "Color Consistency and Adobe Creative Suite". The keywords extracted from said content in the vicinity may be profiles, color, color management, color space, color conversion, CMYK, and RGB. In the current example, there is only one page in the link sequence; therefore, all keywords have the same priority.

FIG. 3B illustrates the links on the page 306 that result from the "Search Google for ICC" selection. The page 306 is now the current page. The link sequence is determined to be page 302→page 306. The current page 306 has a higher priority than page 302. As such, the keywords extracted from the current page 306 have a higher priority than keywords extracted from page 302. Four links 308, 310, 312, 314 exist on the current page. As further described in FIG. 2, keywords are extracted from the destinations of the URLs. Table 1 below shows the keywords that may be extracted from the links.

TABLE 1

| URL | KEYWORDS |
| --- | --- |
| http://www.icc-cricket.com/ | Icc, iccpartnerhero, views, width, media, height, backgroundposition, function, true, may, specials, world, ago . . . |
| http://en.wikipedia.org/wiki/International_Criminal_Court | Court, international, criminal, icc, retrieved, statute, states, may, rome, trial, united, rights,case, march . . . |
| http://www.chessclub.com/ | Store, get, events, free, grandmasters, inputnamesearcheeclickfunction, icc, espanol, each, deutsch . . . |
| http://www.color.org/index.xalter | Icc, profile, profiles, specification, management, workflows, perceptual, widely, profiling, medium, color . . . |

The keywords in the destination link 314, namely, http://www.color.org/index.xalte have the most intersections with the extracted keywords from the previous page, namely keywords "ICC", "profiles", and "color". Therefore, the link 314 is the most relevant and in this example, is indicated as such by making the link 314 in bold.

Similarly, embodiments of the present invention may be used for tablet applications or Smartphone applications where a browser is not required. Embodiments of the invention track navigation in the application and provide indication of what links are relevant. For example, news source application may be navigated in order to learn more information regarding a specific news topic. As an end-user navigates through the news topics within the news source application, relevant links which may lead to more information regarding the news topics may be indicated.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   identifying, by at least one processor, a link sequence of pages followed to arrive at a current page;
   assigning, by the at least one processor, a priority to content from each page of the link sequence based on a location of each page in the link sequence;
   determining, by the least one processor, at least one relevant link from a plurality of links on the current page by:
      comparing content from the pages linked by the plurality of links on the current page to the content from each page of the link sequence; and
      assigning a relevancy to each link of the plurality of links based on the comparison of the content from the pages linked by the plurality of links on the current page to the content from each page of the link sequence and the assigned priority based on the location of each page in the link sequence; and
   indicating the at least one relevant link.

2. The method of claim 1, wherein the current page is at least one of a document or a web page.

3. The method of claim 1, wherein determining at least one relevant link from a plurality of links on the current page further comprises:
   matching the content from the pages linked by the plurality of links on the current page with the content from each page of the link sequence of pages followed to arrive at the current page; and
   identifying a link with most content matches to the content from each page of the link sequence of pages followed to arrive at the current page as the most relevant link.

4. The method of claim 3, wherein matching comprises:
   extracting keywords from the content from each page of the link sequence-based on the assigned priority;
   extracting keywords from the content from the pages linked by the plurality of links on the current page; and
   matching extracted keywords from the content from the pages linked by the plurality of links on the current page with extracted keywords from the content from each page of the link sequence.

5. The method of claim 3, further comprising retrieving content from each page of the link sequence by retrieving a predefined number of lines of content located before and after a clicked link, and wherein a page comprising matches to higher priority content is identified as more relevant than a page comprising matches to lower priority content.

6. The method of claim 3, wherein the priority is higher for a page that is located nearer to the current page in the link sequence.

7. The method of claim 1, wherein indicating comprises providing ranking indicia for a plurality of links on the current page.

8. An apparatus for determining the relevancy of hyperlinks comprising:
   a computer having one or more processors; and
   a storage medium comprising instructions that, when executed by the one or more processors, cause the apparatus to perform a method comprising:
   identifying a link sequence of pages followed to arrive at a current page;
   assigning a priority to content from each page based on a location of each page in the link sequence;
   determining at least one relevant link from a plurality of links on the current page by:
      comparing content from the pages linked by the plurality of links on the current page to the content from each page of the link sequence; and
      assigning a relevancy to each link of the plurality of links based on the comparison of the content from the pages linked by the plurality of links on the current page to the content from each page of the link sequence and the assigned priority based on the location of each page in the link sequence; and
   indicating the at least one relevant link.

9. The apparatus of claim 8, wherein the current page is at least one of a document or a web page.

10. The apparatus of claim 8, wherein comparing the content from the pages linked by the plurality of links on the current page to the content from each page of the link sequence comprises:
   extracting keywords from the content from each page of the link sequence based on the assigned priority;
   extracting keywords from the content from the pages linked by the plurality of links on the current page; and
   matching extracted keywords from the content from the pages linked by the plurality of links on the current page with extracted keywords from the content from each page of the link sequence.

11. The apparatus of claim 10, wherein the priority is higher for a page that is located nearer to the current page in the link sequence.

12. The apparatus of claim 10, wherein a page comprising matches to higher priority keywords is identified as more relevant than a page comprising matches to lower priority keywords.

13. The apparatus of claim 8, wherein indicating comprises providing ranking indicia for a plurality of links on the current page.

14. A non-transitory computer readable medium for storing computer instructions that, when executed by at least one processor causes the at least one processor to perform a method for determining the relevancy of hyperlinks comprising:

identifying a link sequence of pages followed to arrive at a current page;

assigning a priority to content from each page based on a location of each page in the link sequence;

determining at least one relevant link from a plurality of links on the current page by:

comparing content from the pages linked by the plurality of links on the current page to the content from each page of the link sequence; and assigning a relevancy to each link of the plurality of links based on the comparison of the content from the pages linked by the plurality of links on the current page to the content from each page of the link sequence and the assigned priority based on the location of each page in the link sequence; and indicating the at least one relevant link.

15. The computer readable medium of claim 14, wherein the current page is at least one of a document or a web page.

16. The computer readable medium of claim 14, wherein determining at least one relevant link from a plurality of links on the current page further comprises:

matching the content from the pages linked by the plurality of links on the current page with the content from each page of the link sequence; and identifying a link with most content matches to the content from each page of the link sequence as the most relevant link.

17. The computer readable medium of claim 16, wherein matching comprises:

extracting keywords from the content from each page of the link sequence based on the assigned priority;

extracting keywords from the content from the pages linked by the plurality of links on the current page; and matching extracted keywords from the content from the pages linked by the plurality of links on the current page with extracted keywords from the content from each page of the link sequence.

18. The computer readable medium of claim 16, further comprising retrieving content from each page of the link sequence by retrieving a predefined number of lines of content located before and after a clicked link, and wherein a page comprising matches to higher priority content is identified as more relevant than a page comprising matches to lower priority content.

19. The computer readable medium of claim 16, wherein the priority is higher for a page that is located nearer to the current page in the link sequence.

20. The computer readable medium of claim 14, wherein indicating comprises providing ranking indicia for a plurality of links on the current page.

\* \* \* \* \*